(12) United States Patent
Liu

(10) Patent No.: US 11,193,426 B2
(45) Date of Patent: Dec. 7, 2021

(54) ELECTRICALLY GEARED TURBOFAN

(71) Applicant: THE BOEING COMPANY, Chicago, IL (US)

(72) Inventor: Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/850,671

(22) Filed: Apr. 16, 2020

(65) Prior Publication Data

US 2021/0324804 A1 Oct. 21, 2021

(51) Int. Cl.
*F02C 7/36* (2006.01)
*F02K 3/06* (2006.01)

(52) U.S. Cl.
CPC ............... *F02C 7/36* (2013.01); *F02K 3/06* (2013.01); *F05D 2220/36* (2013.01); *F05D 2260/404* (2013.01)

(58) Field of Classification Search
CPC ........ F02C 7/36; F02K 3/06; F05D 2260/404; F05D 2220/36
See application file for complete search history.

(56) References Cited

U.S. PATENT DOCUMENTS

| | | | |
|---|---|---|---|
| 5,595,474 A | 1/1997 | Girard | |
| 10,934,880 B1 | 3/2021 | Liu | |
| 2005/0029887 A1 | 2/2005 | Fecera | |
| 2008/0136189 A1* | 6/2008 | Qu | H02K 49/02 290/52 |
| 2012/0286516 A1 | 11/2012 | Chong | |
| 2014/0328668 A1 | 11/2014 | Anthony | |
| 2015/0108760 A1 | 4/2015 | De Wergifosse et al. | |
| 2015/0244303 A1 | 8/2015 | Gao | |

(Continued)

FOREIGN PATENT DOCUMENTS

| | | |
|---|---|---|
| EP | 1712761 A2 | 10/2006 |
| EP | 2660440 A2 | 11/2013 |
| GB | 2568093 A | 5/2019 |

OTHER PUBLICATIONS

Extended European Search Report for Application No. 20182212.9-1007 dated Dec. 16, 2020.

(Continued)

*Primary Examiner* — Joseph Ortega
(74) *Attorney, Agent, or Firm* — Patterson + Sheridan, LLP

(57) ABSTRACT

The present disclosure provides an electrically gear turbofan that includes a fan; a first spool shaft; and an electrical gearbox including: an armature winding connected to the first spool shaft and coupled to a power source; and a magnetic receiver connected to the fan, and wherein an air gap is defined between the armature winding and the magnetic receiver. The turbines and electrical gearing enable an operator to rotate the spool shaft at a first rotational speed; power an armature winding to generate an armature magnetic field, wherein the armature magnetic field rotates at a second rotational speed; transfer rotational energy via the armature magnetic field from the spool shaft to the magnetic receiver; and rotate the fan at a third rotational speed. In some aspects, the third rotational speed is controlled via a direction and a magnitude of the second rotational speed relative to the first rotational speed.

20 Claims, 10 Drawing Sheets

(56) References Cited

U.S. PATENT DOCUMENTS

| | | |
|---|---|---|
| 2017/0008385 A1 | 1/2017 | Fujimoto et al. |
| 2017/0297728 A1* | 10/2017 | Niergarth ............... B64D 27/24 |
| 2018/0354631 A1 | 12/2018 | Adibhatla |
| 2019/0136768 A1 | 5/2019 | Harvey |
| 2019/0165708 A1 | 5/2019 | Smith |
| 2019/0181689 A1 | 6/2019 | Oyama et al. |
| 2020/0240331 A1 | 7/2020 | Kupratis |
| 2020/0309027 A1* | 10/2020 | Rytkonen .................. F02C 6/20 |

OTHER PUBLICATIONS

Extended European Search Report for Application No. 20217669. 9-1201 dated Sep. 6, 2021.

\* cited by examiner

ELECTRICALLY GEARED TURBOFAN

FIELD

The present disclosure generally relates to turbofan engines. More particularly, the present disclosure relates to turbofan engines configured to convert the mechanical rotational energy from a turbine-driven spool shafts into mechanical rotational energy in the fan via electromotive forces.

BACKGROUND

In a turbofan engine, high pressure exhaust from burning fuel in a combustion chamber rotates various turbines. These turbines, when rotated, in turn impart rotation on spool shafts. The spool shafts, in turn, are connected to various compressors that feed air into the combustion chamber and are further connected to a fan that propels air through a bypass chamber around the turbine. The air propelled by the fan provides a portion (often a significant portion) of the motive force for the turbofan engine, while air ejected from the combustion chamber provides the remainder of the motive force.

During operation of a conventional turbofan engine, the fan rotates at a different rotational speed than the spool shaft that provides rotational forces to the fan via a mechanical gearing arrangement (e.g., planetary gears). Mechanical gearing arrangements are often heavy and bulky, and are prone to mechanical issues (e.g., wear, material fatigue, material stress, lubricant leaks), and thus require frequent inspection and maintenance to keep in working order. Additionally, the physical engagement of mechanical gearing arrangements creates mechanical stresses on the gearing arrangements and causes noise and vibration in the turbofan engine, which impacts aircraft passenger comfort.

SUMMARY

The present disclosure provides a system in one aspect, the system including: a fan of a turbofan engine; a first spool shaft of the turbofan engine; and an electrical gearbox including: an armature winding connected to the first spool shaft and coupled to a power source; and a magnetic receiver connected to the fan, and wherein an air gap is defined between the armature winding and the magnetic receiver.

In one aspect, in combination with any example system above or below, the electrical gearbox is an induction motor, wherein the magnetic receiver is a receiver armature winding.

In one aspect, in combination with any example system above or below, the electrical gearbox is a permanent magnet motor, wherein the magnetic receiver is a permanent magnet array.

In one aspect, in combination with any example system above or below, the magnetic receiver is positioned coaxially within a cavity defined by the armature winding.

In one aspect, in combination with any example system above or below, the armature winding is positioned coaxially within a cavity defined by the magnetic receiver.

In one aspect, in combination with any example system above or below, the armature winding and the magnetic receiver are linked via a radial magnetic field.

In one aspect, in combination with any example system above or below, the system further includes: a second spool shaft, coaxial with the first spool shaft; wherein the power source includes: a permanent magnet connected to the second spool shaft at an interface between a the first spool shaft and the second spool shaft; and a generator armature winding connected to the first spool shaft at the interface and located in a generator magnetic field produced by the permanent magnet; and a frequency converter, coupled to the generator armature winding and to the armature winding.

In one aspect, in combination with any example system above or below, the generator magnetic field propagates radially outward from an axis of rotation for the first spool shaft over a second air gap defined between the permanent magnet and the generator armature winding.

In one aspect, in combination with any example system above or below, the generator magnetic field propagates coaxially to an axis of rotation for the first spool shaft over a second air gap defined between the permanent magnet and the generator armature winding.

The present disclosure provides a turbofan engine in one aspect, the turbofan engine including: a fan; a turbine enclosure, comprising: an air intake at an upstream end; a compression section downstream of the air intake; a combustion section downstream of the compression section; a turbine section downstream of the combustion section; and an exhaust at a downstream end; a first spool shaft coupled with a first compressor of the compression section, with a first turbine of the turbine section; and an electrical gearbox located upstream of the turbine enclosure and coupled with the first spool shaft and the fan, configured to transfer rotational energy from the first spool shaft rotating at a first rotational speed to the fan to rotate the fan at a second rotational speed.

In one aspect, in combination with any example turbofan engine above or below, the first rotational speed is greater than the second rotational speed, wherein the electrical gearbox generates an armature magnetic field that rotates in a first direction opposite to a second direction in which the fan and the first spool shaft rotate.

In one aspect, in combination with any example turbofan engine above or below, the first rotational speed is less than the second rotational speed, wherein the electrical gearbox generates an armature magnetic field that rotates in a shared direction in which the fan and the first spool shaft rotate.

In one aspect, in combination with any example turbofan engine above or below, the turbofan engine of claim 10 further includes a nacelle in which the fan and the turbine enclosure are defined, and wherein the turbine enclosure and the nacelle define a bypass flow chamber therebetween.

In one aspect, in combination with any example turbofan engine above or below, the electrical gearbox comprises: an armature winding, coupled to a power source, and coupled to the first spool shaft; and a magnetic receiver, separated from the armature winding by an air gap, and coupled to the fan.

In one aspect, in combination with any example turbofan engine above or below, the turbofan engine further includes: a second spool shaft coupled with a second compressor of the compression section and with a second turbine of the turbine section and running coaxially with the first spool shaft, wherein the second spool shaft is configured to rotate at a third rotational speed; and wherein the power source comprises: a generator armature winding connected to the first spool shaft; a permanent magnet connected to the second spool shaft and separated from the generator armature winding via a second air gap, wherein the permanent magnet is configured to: emit a generator magnetic field; rotate relative to the generator armature winding at a differential rotational speed corresponding to a difference between the first rotational speed and the third rotational speed; and induce a generated current in the generator armature winding; and a frequency converter connected to the generator armature winding and the electrical gearbox, configured to receive the generated current and transmit an input current of a different frequency than the generated current to power the armature winding in the electrical gearbox.

In one aspect, in combination with any example turbofan engine above or below, the magnetic receiver is a receiver armature winding.

In one aspect, in combination with any example turbofan engine above or below, the magnetic receiver is a permanent magnet array.

The present disclosure provides a method in one aspect, the method including: rotating a spool shaft in a turbofan engine at a first rotational speed; powering an armature winding on a first end of the spool shaft to generate an armature magnetic field, wherein the armature magnetic field rotates at a second rotational speed; transferring rotational energy from the spool shaft to a magnetic receiver coupled to a fan via the armature magnetic field; and rotating the fan at a third rotational speed.

In one aspect, in combination with the method above, the third rotational speed is controlled via a direction and a magnitude of the second rotational speed relative to the first rotational speed.

The present disclosure provides a method in one aspect, the method including: affixing an armature winding to a low pressure compressor spool shaft of a turbofan engine; affixing a magnetic receiver to a hub of a fan of the turbofan engine, wherein the armature winding and the magnetic receiver define an air gap therebetween; and coupling the armature winding to a power source having a controllable frequency current output.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure provides for electrically geared turbofan engines, which substitute the mechanical gearing arrangement between the spool shafts and the fans of conventional implementations for electromagnetic couplings. An electromagnetic coupling beneficially allows for the transfer of rotational energy without physical contact between the gear components, which can reduce the weight and size as well as the maintenance needs of the gearing arrangement compared to mechanical gearing arrangements. Additionally, in some aspects, the (effective) gear ratio between the spool shaft and the fan can be dynamically adjusted to increase or decrease a difference in rotational speeds between the fan and the spool shaft. Stated differently, the rotational speed of the fan can be controlled independently of the rotational speed of the spool shaft, which can provide greater fuel efficiency, greater thrust, and/or greater control over the turbofan engine than is provided by statically geared turbofan engines.

Although the examples provided in the present disclosure primarily illustrate a turbofan of an aircraft, the electrical gearing arrangements described in the present disclosure may be used in conjunction with turbofan engines in various other vehicles.

Figure 1A:
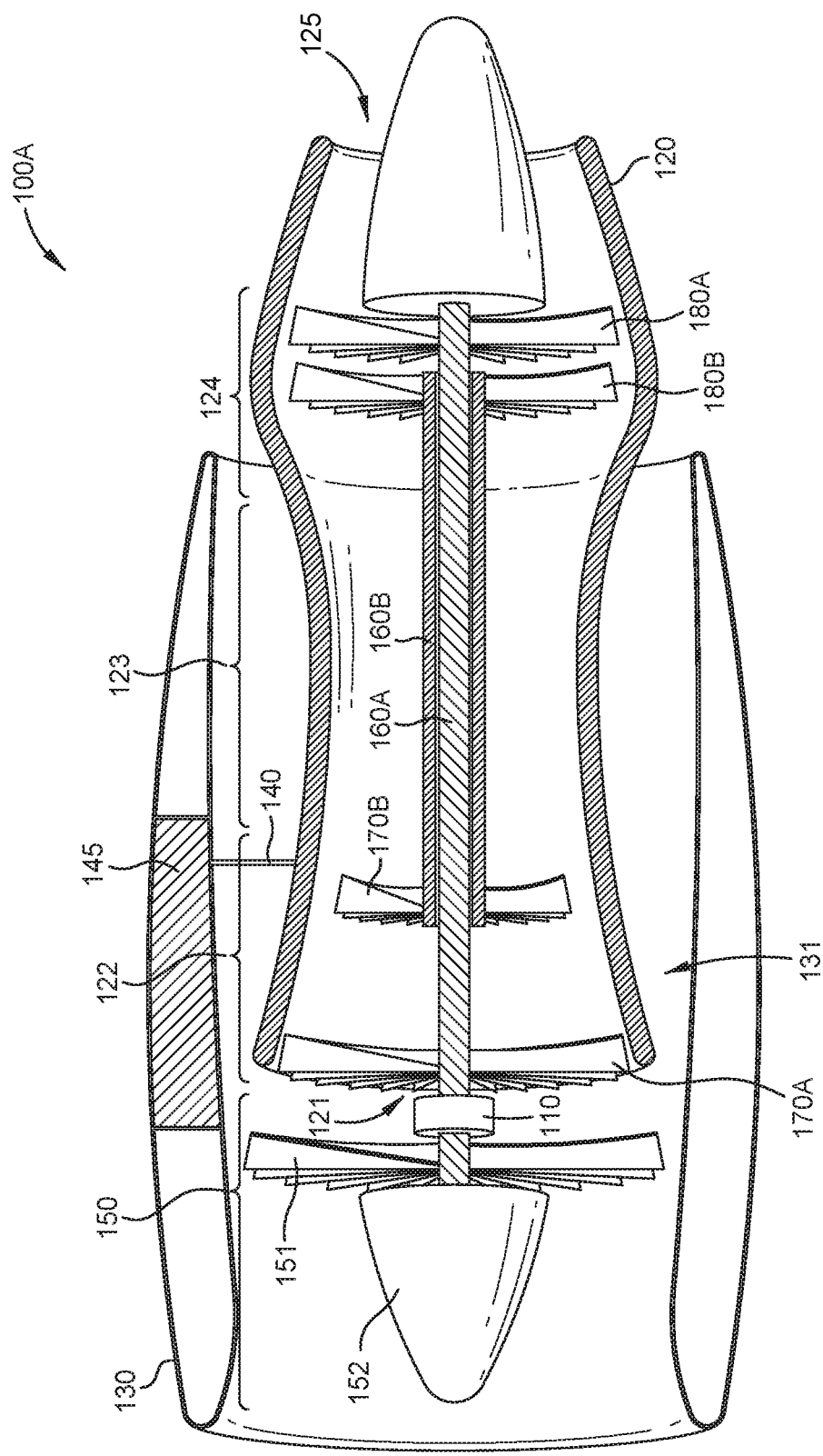
FIGS. 1A and 1B illustrate cross-sectional views of turbofan engines that include an electrical gearbox, according to aspects of the present disclosure.
Figure 1B:
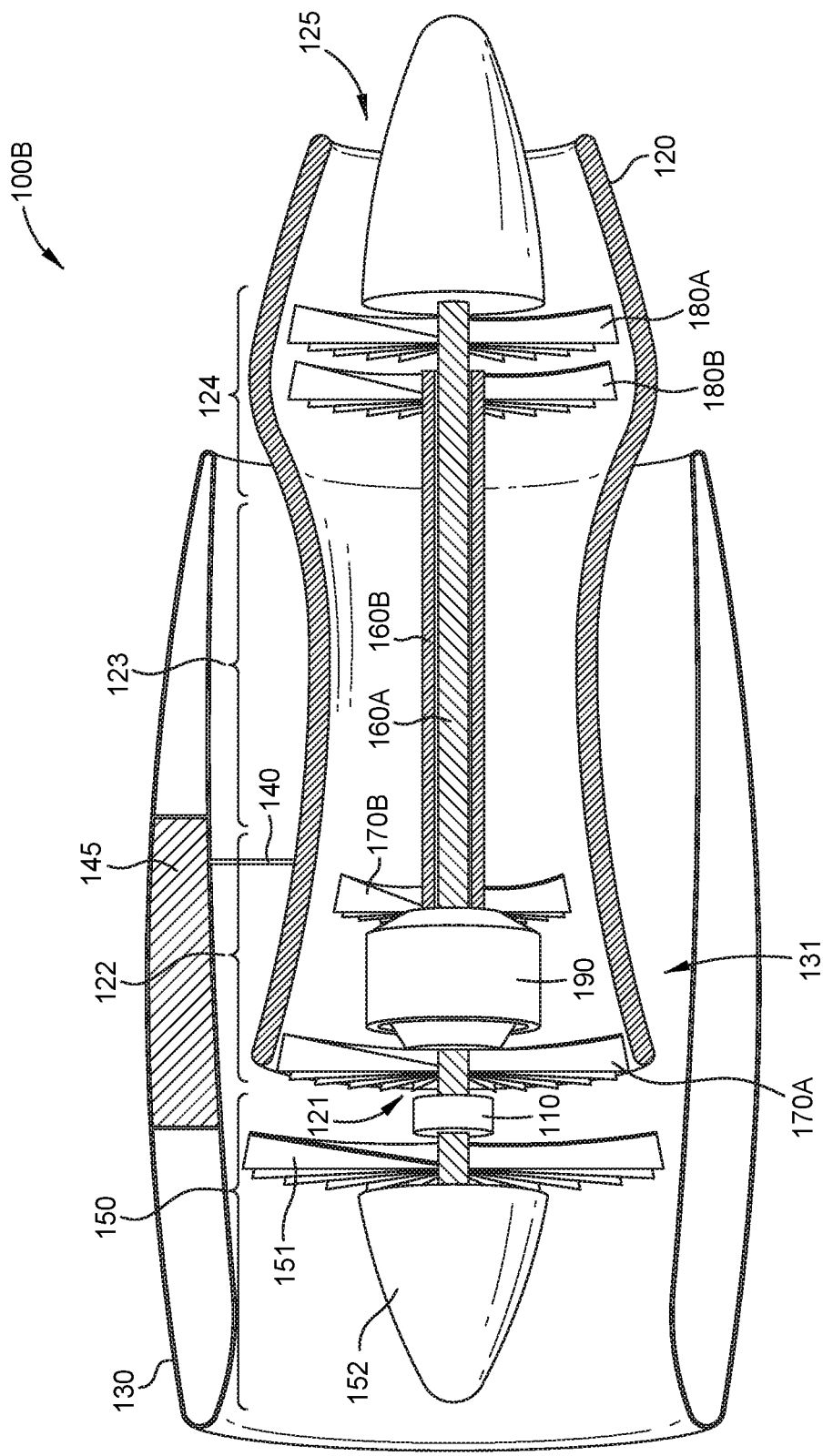

FIGS. 1A and 1B illustrate cross-sectional views of turbofan engines 100, (individually, turbofan engine 100A and turbofan engine 100B) which include an electrical gearbox 110, according to aspects of the present disclosure. The turbofan engines 100 include a turbine enclosure 120 defining an air intake 121 at an upstream end, a compression section 122 downstream of the air intake 121, a combustion section 123 downstream of the compression section 122, a turbine section 124 downstream of the combustion section 123, and an exhaust 125 at a downstream end. In various aspects, the turbine enclosure 120 is included inside of a nacelle 130 (also referred to as a housing), and a bypass flow chamber 131 is defined between an outer surface of the turbine enclosure 120 and an inner surface of the nacelle 130. A fan 150 is positioned in the nacelle 130 upstream of the air intake 121 of the turbine enclosure 120, and during operation rotates to propel air inward to the air intake 121 of turbine enclosure 120 as well as through the bypass flow chamber 131.

The turbofan engines 100 include a first spool shaft 160A (generally, spool shaft or shaft 160 or collectively, shaft assembly) and a second spool shaft 160B. Although the illustrated turbofan engines 100 are shown as have two spool shafts 160 in FIGS. 1A and 1B, in various aspects a turbofan engine 100 can include one, two, three, or more spool shafts 160. In the depicted embodiments, each shaft 160 extends coaxially with the other shafts 160, and rotates during operation at different rates relative to one another due to the ejection of high pressure exhaust rotating the turbines 180A-B (generally, turbine 180), which in turn drive the associated compressors 170A-B (generally, compressor 170) at different rates via the associated spool shafts 160. For example, a first spool shaft 160A rotates (due to forces imparted by the first turbine 180A) to drive the rotation of a first compressor 170A at a first rotational speed, while a second spool shaft 160B rotates (due to forces imparted by the second turbine 180B) to drive the rotation of a second compressor 170B at a second rotational speed.

The compressors 170 are disposed in the compression section 122 of the turbine enclosure 120, and may each include several fan blades arranged in one or more rows. The turbines 180 are disposed in the turbine section 124 of the turbine enclosure 120, and may each include several fan blades arranged in one or more rows. Although not illustrated, various bearings or low friction surfaces may be located between the shafts 160 to improve rotational characteristics of the shafts 160 (e.g., to reduce friction).

As illustrated, the first spool shaft 160A is a low-pressure shaft relative to the high-pressure shaft of the second spool shaft 160B. Accordingly, the first compressor 170A is located upstream of the second compressor 170B, and rotates at a lower rotational speed than the second compressor 170B during operation of the turbofan engine 100. Similarly, the first turbine 180A is located downstream of the second turbine 180B, and rotates at a lower rotational speed than the second turbine 180B during operation of the turbofan engine 100.

The rotation of the low-pressure first spool shaft 160A is transferred to a fan 150 via the electrical gearbox 110. The fan 150, when rotated, forces air through the bypass flow chamber 131 of the turbofan engine 100 to provide motive force to a vehicle using the turbofan engine 100. The fan 150 includes of a plurality of fan blades 151 extending from a central hub 152, and is generally larger in radius than the corresponding blades of the compressors 170 (and turbines 180) in the turbofan engine 100. As such, if rotated at the same angular velocity or rotational speed (e.g., in revolutions per minute) as the compressors 170, the fan 150 would be subject to higher velocities (and mechanical stresses) at the distal ends of the fan blades 151 than the blades of the compressors 170 and turbines 180. For example, the tips of the blades of the compressors 170 (and turbines 180) may travel at subsonic speeds, but the tips of the fan 150 rotating with the subsonic compressors 170 (and turbines 180) may travel at supersonic speeds due to the greater radius of the fan 150, which can cause noise and vibration issues (in addition to mechanical stresses) as the tips of the fan blades 151 break the sound barrier. In a further example, a slower fan speed can allow for a better Specific Fuel Consumption (SFC) efficiency such as when the fan speed, and speeds of the low and high pressure compressors are all controlled and coordinated relative to one another. By using an electrically geared turbofan engine 100, an operator can control the relative fan speed to compressor speeds and thus provide greater SFC efficiently than if selecting from one of a set of fixed gear ratios (as in a mechanically geared system).

The electrical gearbox 110, described in greater detail in regard to FIGS. 2A-2C and 3, couples the first spool shaft 160A with the hub 152 of the fan 150, and allows the first spool shaft 160A (and the associated first compressors 170A) to rotate at one rotational speed, and the fan 150 to rotate at an independent rotational speed. The independent rotational speeds can include cases in which the fan 150 rotates faster than, slower than, or the same speed as the first spool shaft 160A. In some aspects, an operator can also cause the speeds of the fan 150 and the first spool shaft 160A to change relative to one another (e.g., speeding up or slowing down the fan 150).

The electrical gearbox 110 electromagnetically couples the first spool shaft 160A with the fan 150, using magnetically coupled components as a gearing system, rather than physically interlocking gears, so that the portions of the electrical gearbox 110 physically connected to the first spool shaft 160A and the fan 150 are not in physical contact with one another. Instead, controllable electromagnetic fields selectively link the first spool shaft 160A and the fan 150 over an air gap. The electrical gearbox 110 can be powered and/or controlled to vary the strength, speed of rotation, and direction of rotation of the electromagnetic fields linking the shaft-side and fan-side components in the electrical gearbox 110. The power to create these electromagnetic fields can be supplied by a power distribution bus 145 or other power transfer mechanism for a vehicle in which the turbofan engine 100 is disposed (e.g., via a transfer cable 140 or wireless resonant power transmitter), such as in FIG. 1A, or via an electrical generator 190 connected between two spool shafts 160, such as in FIG. 1B, which are discussed in greater detail in regard to FIGS. 4A-4B and 5. In some aspects using an electrical generator 190, the power distribution bus 145 and/or transfer cable 140 can be omitted.

In various aspects, control signals can be transmitted to the electrical gearbox 110 and/or a power supply of the electrical gearbox 110 (or included frequency converter) to alter the (effective) gearing ratio of the electrical gearbox 110 by changing, the strength, speed of rotation, and direction of rotation of the electromagnetic fields to thereby alter a ratio between the fan speed and the shaft speed to control the fan speed. In some aspects, the electrical gearbox 110 is configured to maintain a static gearing ratio, or is controlled via the shaft-speed without further control signal inputs.

An operator can dynamically control the electromagnetic forces applied from the shaft-side of the electrical gearbox 110 to vary how the fan-side of the electrical gearbox 110 is rotated relative to the shafts 160. In some aspects, an operator dynamically controls the gearing ratio of the electrical gearbox 110 to vary the relative speeds of the fan 150 and the first spool shaft 160A, for example, to achieve a steady fan speed while varying the compressor/turbine speeds, to achieve a higher bypass ratio and/or to keep the tip speed of the fan blades 151 below the speed of sound (e.g., improving fuel efficiency, reducing noise and vibration), to alter the amount of thrust provided by the fan 150 relative to the core engine, to rotate the fan 150 faster than the spool shafts 160, etc.

Figure 2A:
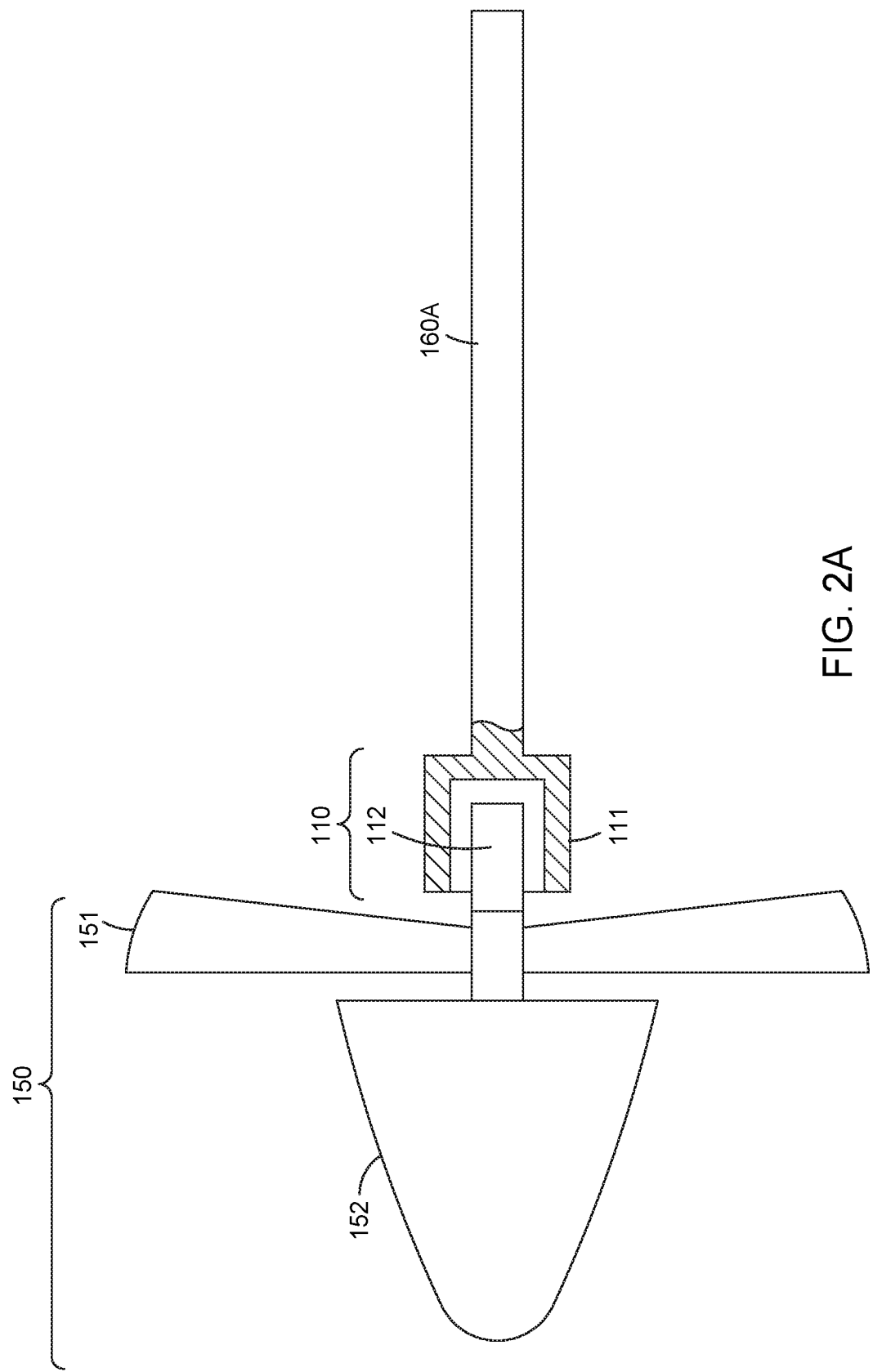
FIGS. 2A-2C illustrate various configurations of electrical gearboxes for turbofan engines, according to aspects of the present disclosure.
Figure 2B:
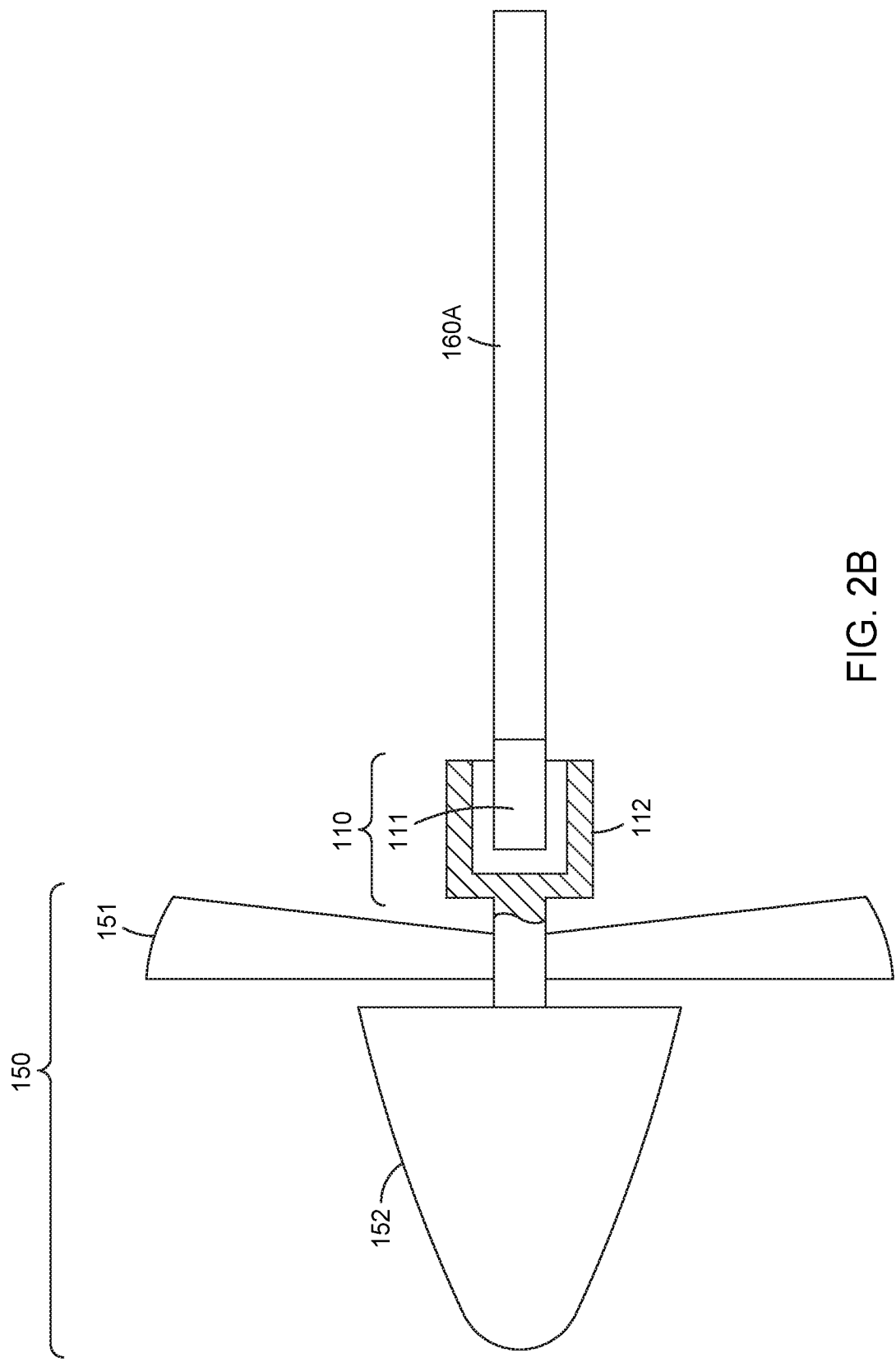
Figure 2C:
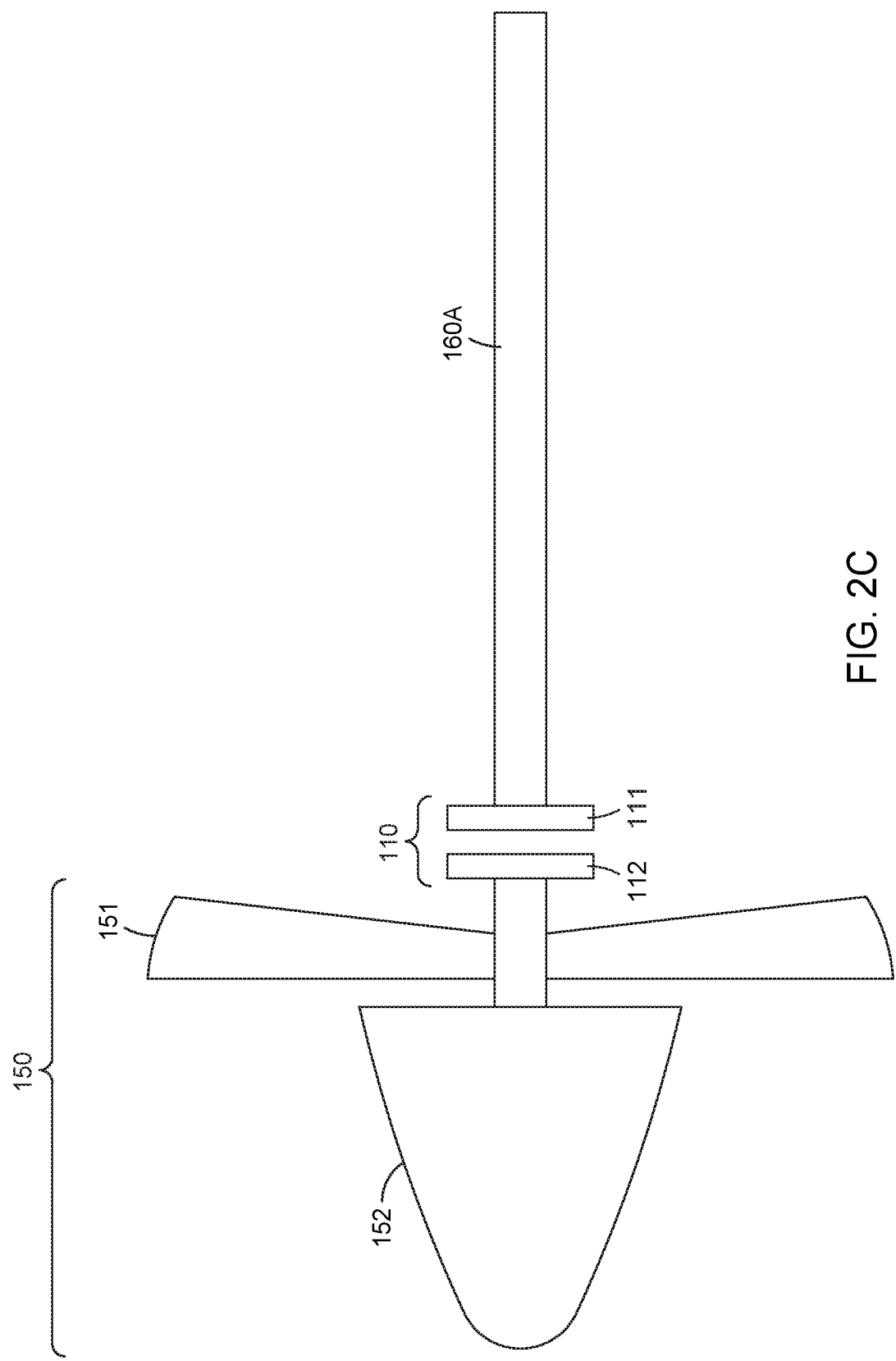

FIGS. 2A-2C illustrate cross-sections for various configurations of the electrical gearbox 110, according to aspects of the present disclosure. As will be appreciated, the electrical gearbox 110 can include a housing or other cover that protects internal components from debris, reduces air resistance, etc., mounting hardware to secure the electrical gearbox 110 to the fan 150 and/or spool shaft 160, etc. Such mechanical features have been omitted from the Figures for clarity in discussing the electromagnetic components and the operation thereof.

In each of the configurations illustrated in FIGS. 2A-2C, an armature winding 111 is connected to the first spool shaft 160A, and when the first spool shaft 160A rotates, so too does the armature winding 111. The armature winding 111, when powered, generates a rotating armature magnetic field, that magnetically couples the armature winding 111 to magnetic receiver 112 connected to the fan 150; transferring rotational energy from the armature winding 111 to the magnetic receiver 112. The magnetic receiver 112 can include permanent magnets or a second armature winding that are configured to receive the armature magnetic field and to cause the fan 150 to rotate based on the combined rotation of the armature magnetic field and the first spool shaft 160A. When the armature windings 111 receives AC currents (i.e., electrical energy), a rotational magnetic field is produced, which interacts with the magnetic field of the magnetic receiver 112 (if permanent magnetics or activated electromagnets are included therein), which produces an electromagnetic torque between the armature winding 111 and the magnetic receiver 112, which causes the magnetic receiver 112 (and the fan 150 attached thereto) to rotate and therefore convert the electrical energy supplied via the AC currents into mechanical energy. An operator can thereby change the frequency of the AC currents provided to the armature windings 111 to change the frequency of the rotational magnetic field, and thus control the rotational speed of the magnetic receiver 112.

In FIG. 2A, the armature winding 111 defines a cavity in which the magnetic receiver 112 is positioned with an air gap between the physical components thereof. The armature winding 111 and the magnetic receiver 112 are coaxially aligned with one another, the hub 152, and the first spool shaft 160A, and are arranged planetary to one another so that the armature magnetic field is projected radially from the armature winding 111 to link the armature winding 111 and the magnetic receiver 112. As used herein, when two objects are described as being "planetary" with one another, it will be understood that the objects rotate about a shared axis of rotation (at the same or different radial distances from the axis of rotation), but at different points along the length of the axis of rotation so as to be clear of the orbit (i.e., not physically contact) of the other object. The selective and dynamic control of the armature magnetic field frequency and rotational direction thereby enables the controllable transfer of rotational energy from the first spool shaft 160A to the fan 150, thus the speed.

In FIG. 2B, the magnetic receiver 112 defines a cavity in which the armature winding 111 is positioned with an air gap between the physical components thereof. The armature winding 111 and the magnetic receiver 112 are coaxially aligned with one another, the hub 152, and the first spool shaft 160A, and are arranged planetary to one another so that the armature magnetic field is projected radially from the armature winding 111 to link the armature winding 111 and the magnetic receiver 112. The selective and dynamic control of the armature magnetic field thereby enables the controllable transfer of rotational energy from the first spool shaft 160A to the fan 150.

In FIG. 2C, the armature winding 111 and the magnetic receiver 112 are positioned in a facing relationship to one another with an air gap between the physical components thereof. The armature winding 111 and the magnetic receiver 112 are coaxially aligned with one another, the hub 152, and the first spool shaft 160A, and are arranged facially to one another so that the armature magnetic field is projected coaxially from the armature winding 111 to link the armature winding 111 and the magnetic receiver 112. The selective and dynamic control of the armature magnetic field thereby enables the controllable transfer of rotational energy from the first spool shaft 160A to the fan 150.

The relative sizes and positions of the electromagnetically coupled components in FIGS. 2A-2C have been illustrated for easy identification and differentiation. However, in various aspects, the relative sizes, shapes, and orientations of these components may be altered based on the physical properties of the turbofan engine 100 in which the components are installed (e.g., length, thickness, circumference, gap distance, rotational torque, and speed, operating temperature), the desired power transfer characteristics for the extracted rotational energy (e.g., gearing ratios, field strengths, relative speeds), and the like. The lengths of the components along the axis of the shafts 160 are determined by the torque and/or power rating requirements of the vehicle from the turbofan engine 100, and the relative sizes and distances of individual components are sized to optimize torque production and speed from the turbofan engine 100 and power transfer efficiency in the electrical gearbox 110 within the physical confines of the turbofan engine 100. Thus, FIGS. 2A-2C are intended to demonstrate the concepts of operation, and not necessarily a specific implementation, which may be modified based on the power requirements, thrust requirements, turbofan engine 100 specific fuel consumption, and material properties of various components.

Figure 3:
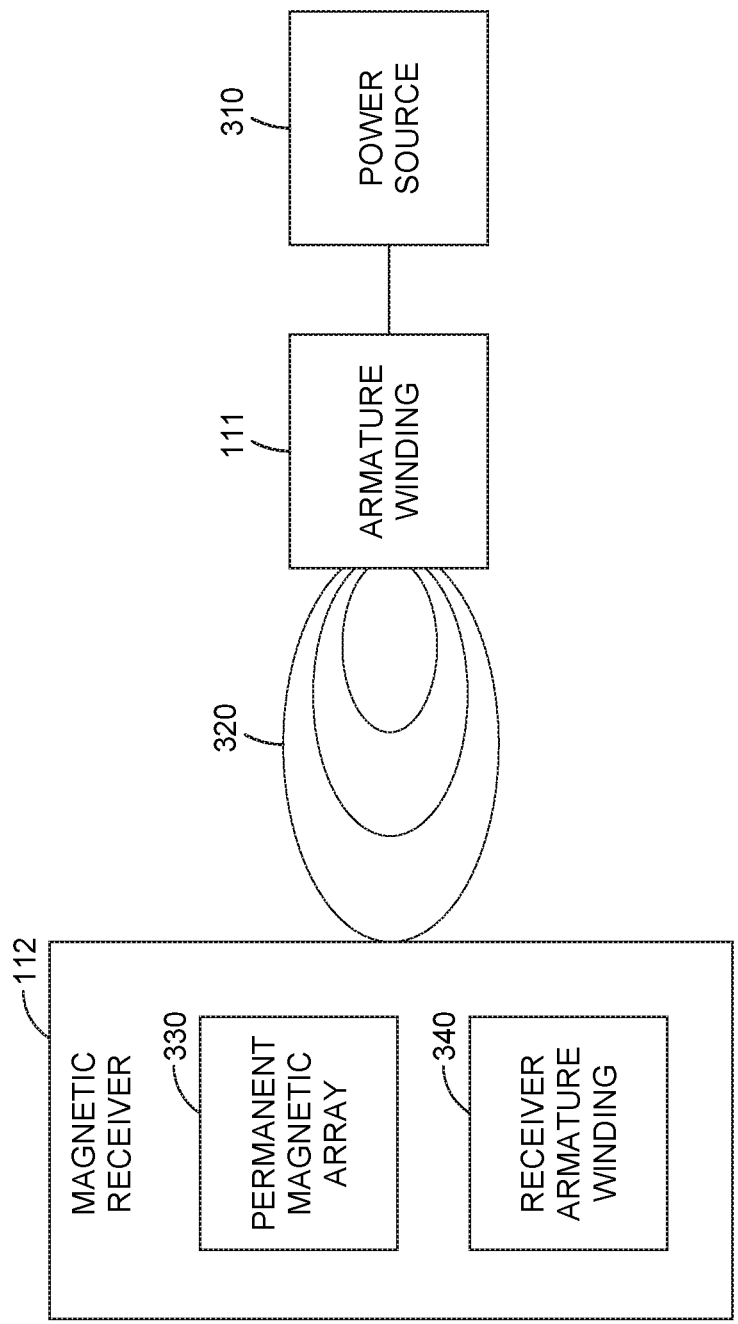
FIG. 3 illustrates a functional block diagram of an electrical gearbox, according to aspects of the present disclosure.

FIG. 3 illustrates a functional block diagram 300 of the electrical gearbox 110, according to aspects of the present disclosure. The armature winding 111 is coupled to a power source 310 (e.g., a power distribution bus 145 or an electrical generator 190), which supplies an input current ($I_i$). Although the input current $I_i$ is denoted as being supplied in three phases (as $I_{i\phi1}$, $I_{i\phi2}$, and $I_{i\phi3}$), in various aspects, the input current $I_i$ may be provided in more or fewer phases. The power source 310 supplies the input current $I_i$ as an Alternating Current (AC) to the armature winding 111 to produce the armature magnetic field 320, and the frequency at which the power source 310 supplies the input current $I_i$ can be changed by a frequency converter (e.g., 520 as is discussed in relation to FIG. 5) that is either part of the power source 310 or provided as a separate device between the power source 310 and the armature winding 111. In some aspects, the frequency converter is secured to the first spool shaft 160A and is configured to receive control signals to alter the frequency of the input current $I_i$ provided to the armature winding 111.

The armature magnetic field 320 links the armature winding 111 to the magnetic receiver 112 so that rotation imparted on the armature winding 111 by the first spool shaft 160A is selectively transferred to the magnetic receiver 112 and thereby to the fan 150. In some aspects, the electrical gearbox 110 is a permanent magnet motor, in which the magnetic receiver 112 includes an array of permanent magnets 330 arranged to receive the armature magnetic field 320. In other aspects, the electrical gearbox 110 is an induction motor, in which the magnetic receiver 112 includes a receiver armature winding 340 arranged to receive the armature magnetic field 320. In yet other aspects, the electrical gearbox 110 is a hybrid motor, in which the magnetic receiver 112 include a combination of an array of permanent magnets 330 and a receiver armature winding 340 that are arranged to receive the armature magnetic field 320.

The rotation of the first spool shaft 160A affects the rotation of the armature magnetic field, regardless of the relative orientations of the physical components of the electrical gearbox 110, and an operator can control the rotation of the armature magnetic field 320 with reference to the shaft-rotation to rotate faster or slower than the rotation of the first spool shaft 160A. As a convention used herein, the rotating speed of the low-pressure compressor shaft (i.e., the first spool shaft 160A) is denoted as $n_{LPC}$, the rotating speed of the armature magnetic field 320 is denoted as $n_m$ (in which positive values indicate co-rotation with the first spool shaft 160A and negative values indicate counter-rotation), and the machine synchronous speed is denoted as $n_s$. The machine synchronous speed $n_s$ can therefore be derived according to Formula 1 as:

$$n_s = n_m + n_{LPC} \quad \text{(Formula 1)}$$

The rotor slip rate, denoted as s, in the electrical gearbox 110 can therefore be derived according to Formula 2, in which the rotor speed is denoted as $n_r$:

$$s = \frac{n_s - n_r}{n_s} = \frac{n_m + n_{LPC} - n_r}{n_m + n_{LPC}} \quad \text{(Formula 2)}$$

The rotor speed, $n_r$, can therefore be derived according to Formula 3 as:

$$n_r = (1-s)(n_m + n_{LPC}) \quad \text{(Formula 3)}$$

Accordingly, the rotor speed $n_r$ can be controlled dynamically to be different from the shaft-speed $n_{LPC}$ by varying the rotation speed $n_m$ of the armature magnetic field 320. By controlling the frequency of the input current $I_i$ used to excite the armature winding 111, an operator can control the rotation speed $n_m$ of the armature magnetic field 320, and thus the speed of the fan 150 (i.e., the rotor speed $n_r$). When the armature magnetic field 320 is produced by a three-phase input current (e.g., $I_{i\phi1}$, $I_{i\phi2}$, and $I_{i\phi3}$), the field rotation direction can be controlled by changing the sequence and frequency of supplying the input current $I_i$, according to Formula 4, in which the frequency is denoted as f, and the number of pair of poles is denoted as p, in which a positive value indicates rotation in the same direction as the first spool shaft 160A (i.e., co-rotation; both rotating clockwise or counterclockwise) and a negative value indicates counter-rotation (i.e., one rotating clockwise and the other rotating counterclockwise).

$$n_m = \frac{120f}{p} \quad \text{(Formula 4)}$$

Therefore, an operator can control the rotational speed $n_r$ of the fan 150 according to Formula 5 by adjusting one or more of the number of pairs of poles p or the frequency f of the input current $I_i$.

$$n_r = (1-s)(120f/p + n_{LPC}) \quad \text{(Formula 5)}$$

Accordingly, control of the frequency f at which the input current $I_i$ is provided to the armature winding 111 can control the relative speed $n_r$ of the fan 150 to the speed $n_{LPC}$ of the first spool shaft 160A used to impart rotational energy to the fan 150. For example, by counter-rotating the armature magnetic field 320 relative to the first spool shaft 160A, an operator can slow the fan 150 compared to the first spool shaft 160A, which can optimize a fuel burn rate for a desired amount of thrust produced by the fan 150 through the bypass flow chamber 131. In a further example, by co-rotating the armature magnetic field 320 relative to the first spool shaft 160A, an operator can generate additional thrust from the fan 150, such as may be desirable during takeoff procedures for an aircraft.

Although the number of paired poles p is typically fixed based on the construction of the electrical gearbox 110, in some aspects an operator can selectively activate or deactivate poles to alter the value of p for further control of the rotor speed $n_r$.

In a permanent magnet motor, in contrast to an induction motor (as is generally described in relation to Formulas 1-5) the rotor runs at a synchronous speed based on the armature field frequency with no slip (i.e., s=0). Accordingly, an operator can use Formulas 6 and 4 to control a permanent magnet motor in an electrical gearbox 110 in a turbofan engine 100 to rotate at a desired rotor speed $n_r$.

$$n_r = n_s = n_m + n_{LCP} \quad \text{(Formula 6)}$$

Figure 4A:
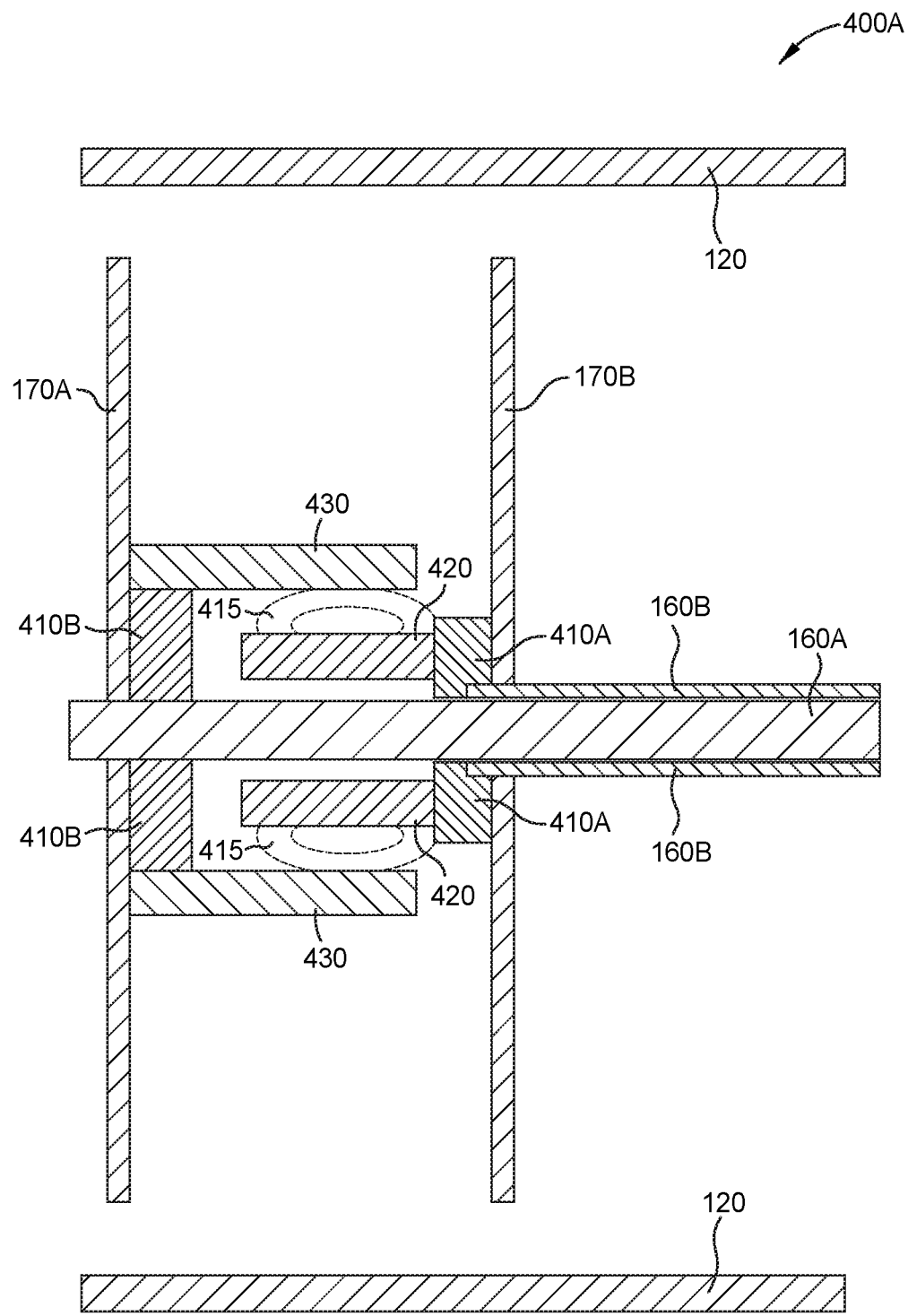
FIGS. 4A and 4B illustrate component arrangements for electrical generators, according to aspects of the present disclosure.
Figure 4B:
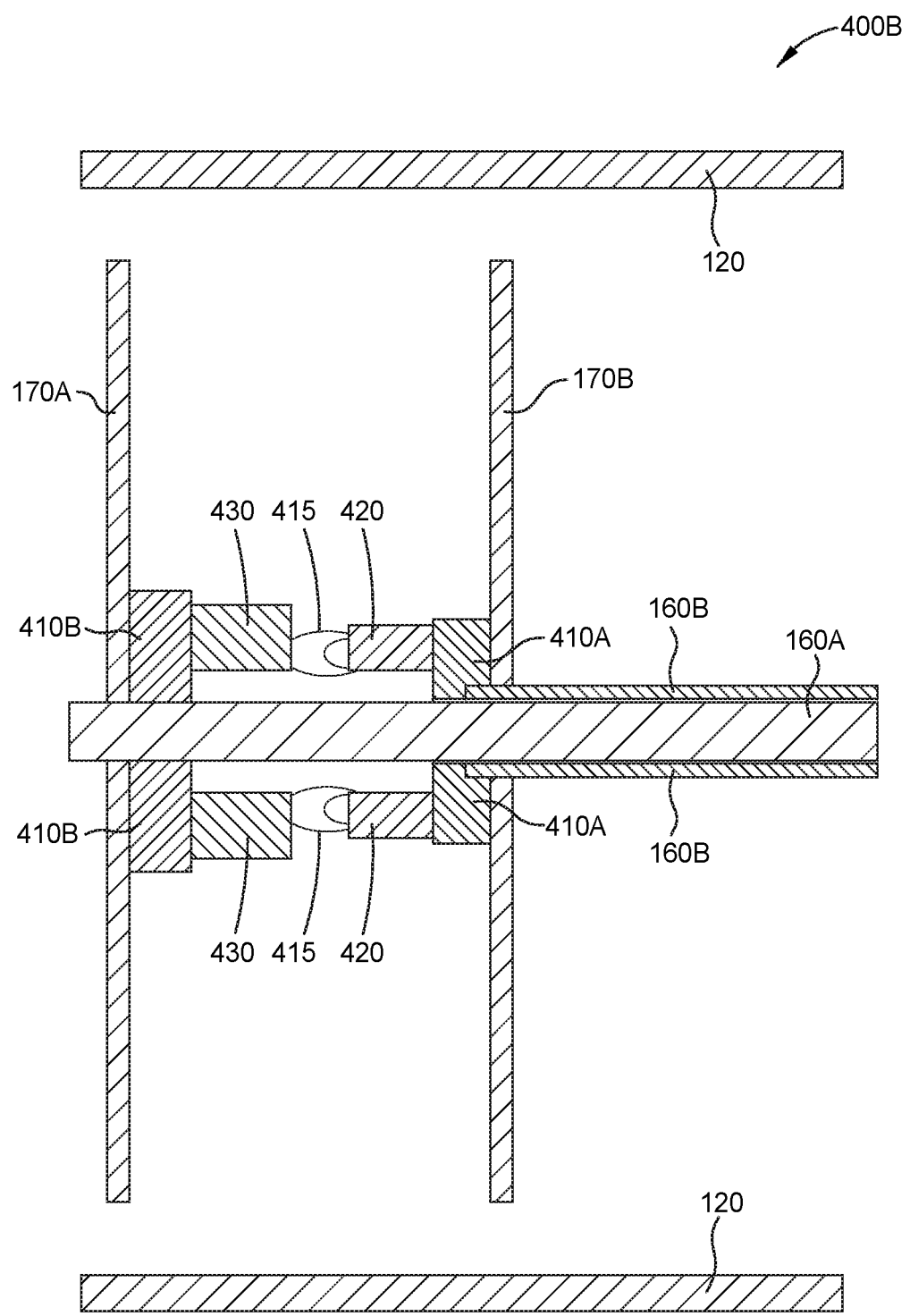

FIGS. 4A and 4B illustrate component arrangements for electrical generators 190, as may be used as power sources 310 to produce a generated current $I_g$ to provide as the input current $I_i$ used by the armature winding 111 to generate the armature magnetic field 320, according to aspects of the present disclosure.

In a multi-shaft turbofan engine 100, each spool shaft 160 can rotate at a different speed from the other spool shafts 160. Accordingly, a differential rotational speed exists between the first spool shaft 160A and the second spool shaft 160B (and any components attached thereto) during operation. By attaching components of the electrical generators 190 to two different spool shafts (e.g., 160A and 160B) or to two different compressors (e.g., 170A and 170B) at the respective interfaces therebetween, the electrical generator 190 can, based on the differential rotational speed, convert rotational energy into electrical energy via a series of induced magnetic fields that can then be transferred to the armature winding 111 without requiring physical contact between the generator components rotating at different rates. The electrical generators 190 capitalize on the different rotational speeds of the compressors 170 attached to different shafts 160 to rotate the components relative to one another using the operational rotation of the components of the turbofan engine 100.

FIG. 4A illustrates a first component arrangement 400A for an electrical generator 190, according to aspects of the present disclosure. A first rotor assembly 410A is connected to a second (higher-pressure) compressor 170B and a second rotor assembly 410B is connected to a first (lower-pressure) compressor 170A at an interface between the two compressors 170. In various aspects, the rotor assemblies 410 are connected to one or more blades of the associated compressor 170, to a ring/connection point of the blades to an associated spool shaft 160, or to the associated spool shaft 160. The rotor assemblies 410 position various electromagnetic components of the electrical generator 190 at known distances and orientations relative to one another, the shafts 160, and the compressors 170.

In FIG. 4A, the first rotor assembly 410A includes a permanent magnet 420, which produces a generator magnetic field 415. The permanent magnet 420 emits the generator magnetic field 415 radially through an air gap defined coaxially to the shafts 160 to magnetically link the permanent magnet 420 with a generator armature winding 430 included in the second rotor assembly 410B. In various aspects, the permanent magnet 420 may include a plurality of magnets arranged circumferentially around the shaft 160 to emit a plurality of generator magnetic fields 415.

The second rotor assembly 410B includes the generator armature winding 430 arranged concentrically and radially, but not in physical contact with, the permanent magnet 420 or the shafts 160, and positions the generator armature winding 430 within a predefined field strength of the generator magnetic field 415. Accordingly, the generator magnetic field 415 radially links the permanent magnet 420 and the generator armature winding 430. In various aspects, when rotated relative to the permanent magnet 420, the generator armature winding 430 produces the generated currents $I_g$ as a multiphase alternating current, which powers the armature winding 111 to generate the armature magnetic field 320 either directly (e.g., $I_g = I_i$) or via a frequency converter to change the frequency of the generated current $f_g$ to desired frequency $f_i$ of the input current $I_i$ FIG. 4B illustrates a second component arrangement 400B for an electrical generator 190, according to aspects of the present disclosure. A first rotor assembly 410A is connected to a higher-pressure first compressor 170A and a second rotor assembly 410B is connected to a lower-pressure second compressor 170B at an interface between the two compressors 170. In various aspects, the rotor assemblies 410 are connected to one or more blades of the associated compressor 170, to a ring/connection point of the blades to an associated spool shaft 160, or to the associated spool shaft 160. The rotor assemblies 410 position various electromagnetic components of the electrical generator 190 at known distances and orientations relative to one another, the shafts 160, and the compressors 170.

In FIG. 4B, the first rotor assembly 410A includes a permanent magnet 420, which produces a generator magnetic field 415. The permanent magnet 420 emits the generator magnetic field 415 through an air gap defined in a plane intersecting the axis of rotation for the shafts 160 to magnetically link the permanent magnet 420 with a generator armature winding 430 included in the second rotor assembly 410B. Although illustrated as defining an air gap in a plane orthogonal to the axis of rotation (e.g., for a coaxial magnetic linkage between the permanent magnet 420 and the generator armature winding 430), in other aspects, the air gap may be defined at other angles relative to the shafts 160. In various aspects, the permanent magnet 420 may include a plurality of magnets arranged radially around the shaft 160 to emit a plurality of generator magnetic fields 415.

The second rotor assembly 410B includes the generator armature winding 430 arranged radially around, but not in physical contact with, the shafts 160 and arranged planetary to the permanent magnet 420. The relative positions and lengths of the rotor assemblies 410 position the generator armature winding 430 within a predefined field strength of the generator magnetic field 415. Accordingly, the generator magnetic field 415 axially links the permanent magnet 420 and the generator armature winding 430. In various aspects, when rotated relative to the permanent magnet 420, the generator armature winding 430 produces the generated current $I_g$ as a multiphase alternating current, which powers the armature winding 111 to generate the armature magnetic field 320 either directly (e.g., $I_g=I_i$) or via a frequency converter to change the frequency of the generated current $f_g$ to desired frequency $f_i$ of the input current $I_i$.

During operation of the turbofan engine 100 in which the components are disposed, the rotational forces imparted by turbines 180 cause the compressors 170 and attached EM components to rotate relative to one another and the stationary turbine enclosure 120. Due to the differential in the rotational speeds of the higher-pressure compressor 170B and the lower-pressure compressor 170A, the generator magnetic field 415 rotates relative to the generator armature winding 430. Accordingly, electrical energy is extracted from the rotational forces of the shafts 160 and is transferred to power the armature winding 111 of the electrical gearbox 110.

The relative sizes and positions of the electromagnetically coupled components in FIGS. 4A and 4B have been illustrated for easy identification and differentiation. However, in various aspects, the relative sizes, shapes, and orientations of these components may be altered based on the physical properties of the turbofan engine 100 in which the components are installed (e.g., length, thickness, circumference, gap distance, rotational torque, and speed, operating temperature), the desired power characteristics for the extracted power (e.g., number of power phases, voltage/current levels), and the like. The lengths of the components along the axis of the shafts 160 are determined by the torque and/or power rating requirements of the vehicle from the turbofan engine 100, and the relative sizes and distances of individual components are sized to optimize torque production and speed from the turbofan engine 100 and power transfer efficiency in the electrical generator 190 within the physical confines of the turbofan engine 100. Thus, FIGS. 4A and 4B are intended to demonstrate the concepts of operation, and not necessarily a specific implementation, which may be modified based on the power requirements, thrust requirements, turbofan engine 100 specific fuel consumption, and material properties of various components. For example, a fabricator can design the permanent magnet 420 and the generator armature winding 430 according to FIG. 4A when radial space along the length of blades of the compressors 170 is more readily available or according to FIG. 4B when axial space between the compressors 170 is more readily available.

Figure 5:
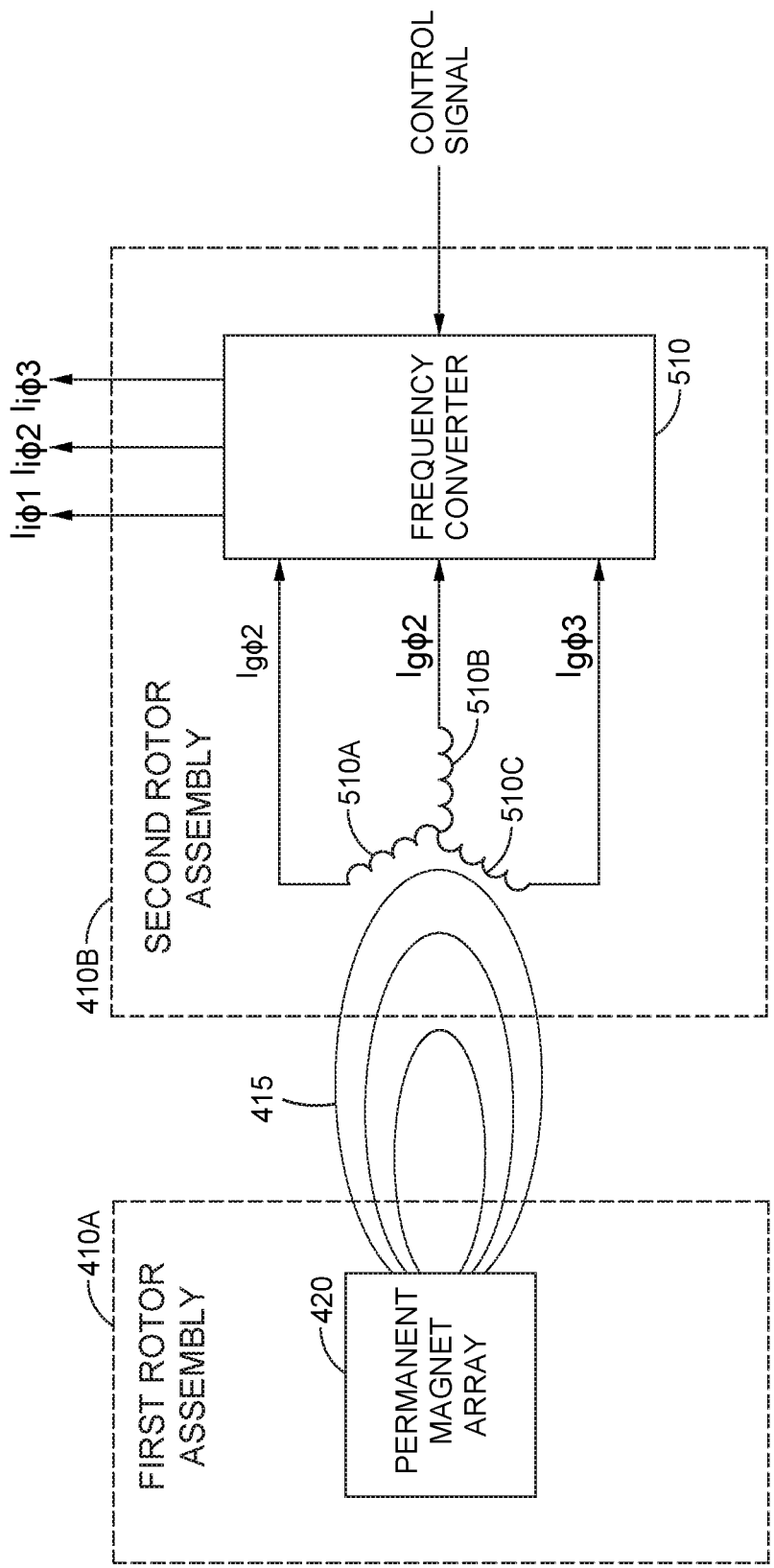
FIG. 5 illustrates a circuit diagram of an electrical generator in use as a power supply for an armature winding of an electrical gearbox, according to aspects of the present disclosure.

FIG. 5 illustrates a circuit diagram of the electrical generator 190 in use as the power source 310 for the armature winding 111 of the electrical gearbox 110, according to aspects of the present disclosure. The first rotor assembly 410A (which includes the permanent magnet 420) is arranged in magnetic contact, but not physical contact, with the second rotor assembly 410B (which includes the generator armature winding 430) via the generator magnetic field 415. As used herein, magnetic contact describes the state in which a magnetic field produced by a permanent or electromagnet is of at least a predefined strength between two components. The generator armature winding 430 includes a plurality of receiving windings 510A-C (generally, receiving winding 510) that each produce one phase of power from the received generator magnetic field 415. Although illustrated as providing three-phase current to three corresponding receiving windings 510A-C, in other aspects, more or fewer than three phases may be used by, for example, using more or fewer receiving windings 510.

The first rotor assembly 410A is connected to one compressor 170 of the turbofan engine 100, such as shown in FIGS. 4A and 4B and the second rotor assembly 410B is connected to a second compressor 170 of the turbofan engine 100, such as shown in FIGS. 4A and 4B. Due to the difference in rotational speeds of each compressor 170 when the turbofan engine 100 is in operation, the first rotor assembly 410A rotates at a different speed from the second rotor assembly 410B.

The second rotor assembly 410B is supplies the generated current $I_g$ to the frequency converter 520, which selectively controls the frequency f of the input current $I_i$ based on control signals (e.g., from a vehicle operator) indicating the desired rotational speed $n_m$ for the armature magnetic field 320. In some aspects, the frequency converter 520 increases or decreases the frequency $f_i$ of the input current $I_i$ relative to the frequency $f_g$ of the generated current $I_g$, but may also leave the frequency f unchanged (e.g., $f_g=f_i$).

Figure 6:
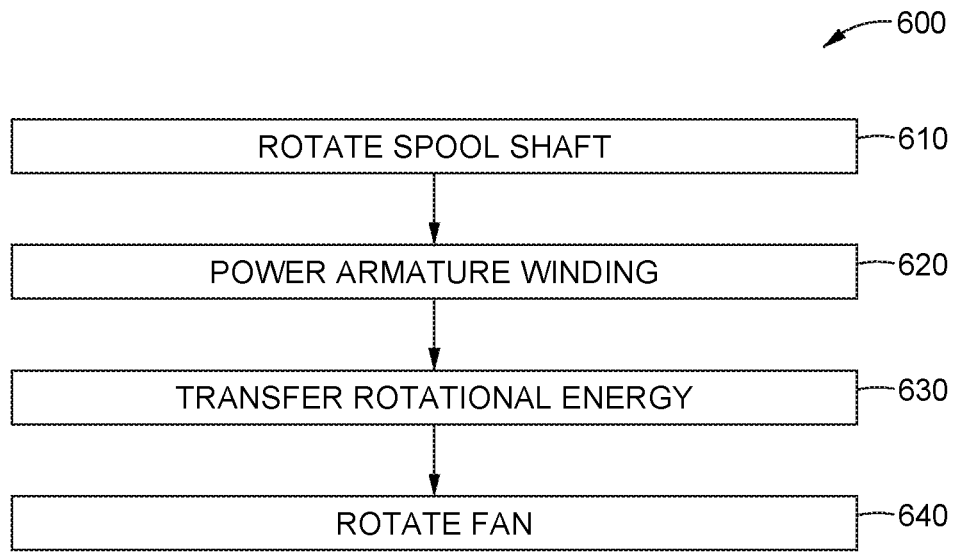
FIG. 6 is a flowchart of a method for operating a turbofan engine having an electrical gearbox, according to aspects of the present disclosure.

FIG. 6 is a flowchart of a method 600 for operating a turbofan engine 100 having an electrical gearbox 110, according to aspects of the present disclosure. Method 600 begins with block 610, where the spool shafts 160 of the turbofan engine 100 rotate. In a turbofan engine 100, an operator may cause spool shafts 160 to rotate by engaging the turbofan engine 100 to produce thrust for a vehicle; inducing rotational energy upon spool shafts 160 by the combustion of fuel in a combustion chamber and expelling the exhaust through a turbine section 124, thus causing the turbines 180 to rotate the corresponding spool shafts 160. Depending on the number of spool shafts 160 in the turbofan engine 100, the thrust requirements of the vehicle using the turbofan engine 100, the altitude of the vehicle using the turbofan engine 100, etc., the spool shafts 160 may rotate at various different speeds.

At block 620, an operator powers an armature winding 111 to generate an armature magnetic field 320 that rotates at a desired speed $n_m$ relative to the rotational speed $n_{LPC}$ of the first (low-pressure) spool shaft 160A. In various aspects, a multiphase input current $I_i$ is provided to produce the armature magnetic field by various different sources according to a desired magnitude to magnetically couple the armature winding 111 with the magnetic receiver 112 and at a desired input frequency $f_i$ to rotate at the desired speed $n_m$.

In some aspects, the vehicle in which the turbofan engine 100 is included supplies the input current $I_i$ to the armature winding 111 from a power distribution bus 145 (e.g., via a transfer cable 140). In some aspects, the input current $I_i$ received from the power distribution bus 145 is transmitted by the power distribution bus 145 at the input frequency $f_i$ used by the armature winding 111 to produce the armature magnetic field 320 at the desired speed $n_m$. In other aspects, the input current $I_i$ is converted by a frequency converter 520 to the input frequency $f_i$ used by the armature winding 111 to produce the armature magnetic field 320 at the desired speed $n_m$ from an original frequency provided by the power distribution bus 145.

In aspects including an electrical generator 190 in the interface region between two spool shafts 160 or compressors 170, the different rotational speeds of adjacent rotating spool shafts 160 can be used to also rotate a first rotor assembly 410A relative to a second rotor assembly 410B to generate a generated current $I_g$ at a generated frequency $f_g$, which may be converted (according to control signals) by a frequency converter 520 to an input current $I_i$ at an input frequency $I_i$ for use by an armature winding 111 to produce an armature magnetic field 320 that rotates at a desired speed $n_m$ relative to the first (low-pressure) spool shaft 160A.

At block 630, the electrical gearbox 110 transfers rotational energy from the first spool shaft 160A to the fan 150 via the magnetic coupling between the armature winding 111 and the magnetic receiver 112. Because the armature winding 111 and the magnetic receiver 112 are magnetically coupled, when the armature winding 111 moves, the armature magnetic field 320 causes the magnetic receiver 112 to follow the rotation of the armature winding 111. Accordingly, as the first spool shaft 160A imparts rotation on the armature winding 111, when the armature winding 111 generates the armature magnetic field 320, the rotation of the armature winding 111 is imparted on the magnetic receiver 112. The magnetic receiver 112, in turn, imparts rotational energy on the fan 150 to which the magnetic receiver 112 is physically connected.

At block 640, the fan 150 rotates according to the rotor speed $n_r$ imparted by the armature magnetic field 320 on the magnetic receiver 112. The speed $n_r$ of the fan 150 may be equal to the speed $n_{LPC}$ of the first spool shaft 160A (e.g., when $n_m=0$), greater than the speed $n_{LPC}$ of the first spool shaft 160A (e.g., when $n_m>0$; co-rotating with the first spool shaft 160A), or less than the speed $n_{LPC}$ of the first spool shaft 160A (e.g., when $n_m<0$; counter-rotating to the first spool shaft 160A).

Figure 7:
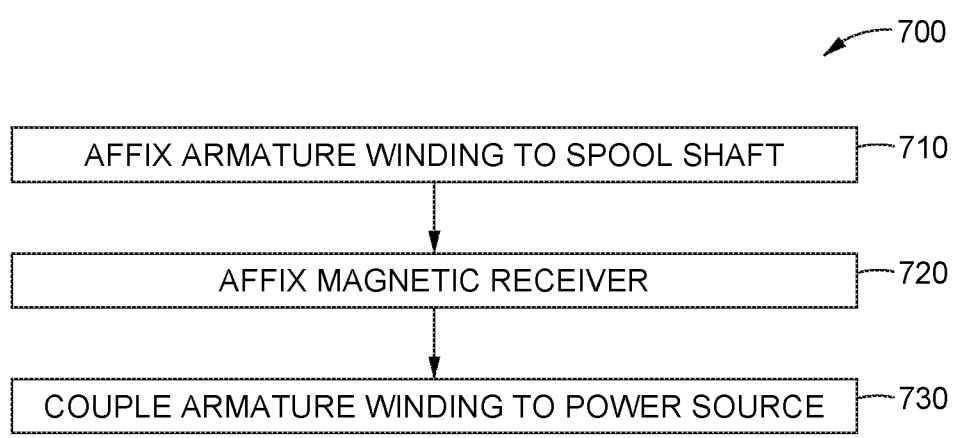
FIG. 7 is a flowchart of a method for fabricating a turbofan engine with an electrical gearbox, according to aspects of the present disclosure.

FIG. 7 is a flowchart of a method 700 for fabricating a turbofan engine 100 with an electrical gearbox 110, according to aspects of the present disclosure.

At block 710, a fabricator affixes the armature winding 111 of an electrical gearbox 110 with a distal end of the low-pressure spool shaft 160 of a turbofan engine 100 projecting upstream from the compressors 170 (or where the compressors 170 will be later installed).

At block 720, the fabricator affixes the magnetic receiver 112 of the electrical gearbox 110 with a fan 150 for the turbofan engine 100. In various aspects, the magnetic receiver 112 is affixed to the hub 152 of the fan 150 or to a shaft projecting from the hub 152.

When blocks 710 and 720 have been performed, the electrical gearbox 110, the fan 150, and the low-pressure spool shaft 160 share a common axis of rotation. An air gap is defined within the electrical gearbox 110 between the armature winding 111 and the magnetic receiver 112, and when the armature winding 111 is unpowered, each of the fan 150 and the low-pressure spool shaft 160 can rotate independently of one another. For example, a technician can rotate the fan 150 without rotating the low-pressure spool shaft 160 or vice versa when the armature winding 111 does not generate the armature magnetic field 320.

Therefore, at block 730, the fabricator couples the armature winding 111 to a power source 310 to enable the armature winding 111 to selectively generate an armature magnetic field 320 to magnetically couple the armature winding 111 and the magnetic receiver 112 to transfer rotational energy between the spool shaft 160 and the fan 150. In various aspects, the fabricator includes a frequency converter 520 either in the power source 310 or in communication between the power source 310 and the armature winding 111 to selectively control the frequency f of the input current $I_i$ supplied to the armature winding 111 to thereby increase or decrease the rotational speed of the fan 150 relative to the low-pressure spool shaft 160. The fabricator can couple the armature winding 111 to various power sources 310, including, but not limited to, the power distribution bus 145 of the vehicle in which the turbofan engine 100 is included and an electrical generator 190 disposed at the interface between two spool shafts 160 configured to generate power based on the differential rotational speed between the two spool shafts 160. The fabricator can couple the frequency converter 520 to various control systems (e.g., a flight control system for an aircraft including the turbofan engine 100) to vary the frequency f of the input current $I_i$ to change or maintain the speed of the fan 150 relative to the rotational speed of the low-pressure spool shaft 160A.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted and received using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, fabrication, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A system, comprising:
   a fan (150) of a turbofan engine (100);
   a first spool shaft (160A) of the turbofan engine;
   a second spool shaft (160B), coaxial with the first spool shaft;
   a power source (310) including:
      a permanent magnet (420) connected to the second spool shaft at an interface between a the first spool shaft and the second spool shaft; and
      a generator armature winding (430) connected to the first spool shaft at the interface and located in a generator magnetic field (415) produced by the permanent magnet; and
      a frequency converter (520), coupled to the generator armature winding and to the armature winding; and
   an electrical gearbox (110) including:
      an armature winding (111) connected to the first spool shaft and coupled to a power source; and
      a magnetic receiver (112) connected to the fan, and wherein an air gap is defined between the armature winding and the magnetic receiver.

2. The system of claim 1, wherein the electrical gearbox is an induction motor, wherein the magnetic receiver is a receiver armature winding (340).

3. The system of claim 1, wherein the electrical gearbox is a permanent magnet motor, wherein the magnetic receiver is a permanent magnet array (330).

4. The system of claim 1, wherein the magnetic receiver is positioned coaxially within a cavity defined by the armature winding.

5. The system of claim 1, wherein the armature winding is positioned coaxially within a cavity defined by the magnetic receiver.

6. The system of claim 1, wherein the armature winding and the magnetic receiver are linked via a radial magnetic field.

7. The system of claim 1, wherein the generator magnetic field propagates radially outward from an axis of rotation for the first spool shaft over a second air gap defined between the permanent magnet and the generator armature winding.

8. The system of claim 1, wherein the generator magnetic field propagates coaxially to an axis of rotation for the first spool shaft over a second air gap defined between the permanent magnet and the generator armature winding.

9. A turbofan engine (100), comprising:
   a fan (150);
   a turbine enclosure (120), comprising:
      an air intake (121) at an upstream end;

a compression section (122) downstream of the air intake;

a combustion section (123) downstream of the compression section;

a turbine section (124) downstream of the combustion section; and an exhaust (125) at a downstream end;

a first spool shaft (160A) coupled with a first compressor (170A) of the compression section, with a first turbine (180A) of the turbine section; and an electrical gearbox (110) located upstream of the turbine enclosure and coupled with the first spool shaft and the fan, configured to transfer rotational energy from the first spool shaft rotating at a first rotational speed to the fan to rotate the fan at a second rotational speed, wherein:

the first rotational speed is greater than the second rotational speed; and the electrical gearbox generates an armature magnetic field (320) that rotates in a first direction opposite to a second direction in which the fan and the first spool shaft rotate.

10. The turbofan engine of claim 9, wherein the first rotational speed is less than the second rotational speed, wherein the electrical gearbox generates an armature magnetic field (320) that rotates in a shared direction in which the fan and the first spool shaft rotate.

11. The turbofan engine of claim 9, further comprising a nacelle (130) in which the fan and the turbine enclosure are defined, and wherein the turbine enclosure and the nacelle define a bypass flow chamber (131) therebetween.

12. The turbofan engine of claim 9, wherein the electrical gearbox comprises:

an armature winding (111), coupled to a power source (310), and coupled to the first spool shaft; and a magnetic receiver (112), separated from the armature winding by an air gap, and coupled to the fan.

13. The turbofan engine of claim 12, further comprising:

a second spool shaft (160B) coupled with a second compressor (170B) of the compression section and with a second turbine (180B) of the turbine section and running coaxially with the first spool shaft, wherein the second spool shaft is configured to rotate at a third rotational speed; and wherein the power source comprises:

a generator armature winding (430) connected to the first spool shaft;

a permanent magnet (420) connected to the second spool shaft and separated from the generator armature winding via a second air gap, wherein the permanent magnet is configured to:

emit a generator magnetic field (415);

rotate relative to the generator armature winding at a differential rotational speed corresponding to a difference between the first rotational speed and the third rotational speed; and induce a generated current in the generator armature winding; and a frequency converter (520) connected to the generator armature winding and the electrical gearbox, configured to receive the generated current and transmit an input current of a different frequency than the generated current to power the armature winding in the electrical gearbox.

14. The turbofan engine of claim 12, wherein the magnetic receiver is a receiver armature winding (330).

15. The turbofan engine of claim 12, wherein the magnetic receiver is a permanent magnet array (320).

16. A method (600), comprising:

rotating (610) a spool shaft (160) in a turbofan engine (100) at a first rotational speed;

powering an armature winding (111) on a first end of the spool shaft (160) to generate an armature magnetic field (320), wherein the armature magnetic field rotates at a second rotational speed less than the first rotational speed in a direction opposite to the spool shaft;

transferring rotational energy from the spool shaft to a magnetic receiver coupled to a fan via the armature magnetic field; and rotating the fan at a third rotational speed.

17. The method of claim 16, wherein the third rotational speed is controlled via a direction and a magnitude of the second rotational speed relative to the first rotational speed.

18. A method (700), comprising:

affixing (710) an armature winding (111) to a low pressure compressor spool shaft (160) of a turbofan engine (100);

affixing a magnetic receiver (112) to a hub (152) of a fan (150) of the turbofan engine, wherein the armature winding and the magnetic receiver define an air gap therebetween;

affixing a power source to a high pressure compressor spool shaft coaxial with the low pressure compressor spool shaft, wherein the power source includes:

a permanent magnet (420) connected to the high pressure compressor spool shaft at an interface between a the low pressure compressor spool shaft and the high pressure compressor spool shaft; and a generator armature winding (430) connected to the low pressure compressor spool shaft at the interface and located in a generator magnetic field (415) produced by the permanent magnet; and coupling the armature winding to the power source (310) having a controllable frequency current output via a frequency converter (520).

19. The method of claim 18, wherein the generator magnetic field propagates radially outward from an axis of rotation for the low pressure compressor spool shaft over a second air gap defined between the permanent magnet and the generator armature winding.

20. The method of claim 18, wherein the generator magnetic field propagates coaxially to an axis of rotation for the low pressure compressor spool shaft over a second air gap defined between the permanent magnet and the generator armature winding.

* * * * *

UNITED STATES PATENT AND TRADEMARK OFFICE
CERTIFICATE OF CORRECTION

PATENT NO. : 11,193,426 B2  
APPLICATION NO. : 16/850671  
DATED : December 7, 2021  
INVENTOR(S) : Shengyi Liu Page 1 of 1

It is certified that error appears in the above-identified patent and that said Letters Patent is hereby corrected as shown below:

In the Claims

In Column 16, Line 27, in Claim 1, delete "a the" and insert -- the --.

In Column 18, Line 39, in Claim 18, delete "a the" and insert -- the --.

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*